(12) United States Patent
Otagiri et al.

(10) Patent No.: US 10,298,150 B2
(45) Date of Patent: May 21, 2019

(54) POWER GENERATING ELEMENT AND POWER GENERATING DEVICE UTILIZING VIBRATION ENERGY

(71) Applicants: Mizuki Otagiri, Kanagawa (JP); Tsuneaki Kondoh, Kanagawa (JP); Yuko Arizumi, Kanagawa (JP); Tomoaki Sugawara, Kanagawa (JP); Junichiro Natori, Kanagawa (JP); Mayuka Araumi, Tokyo (JP); Takahiro Imai, Tokyo (JP); Megumi Kitamura, Tokyo (JP)

(72) Inventors: Mizuki Otagiri, Kanagawa (JP); Tsuneaki Kondoh, Kanagawa (JP); Yuko Arizumi, Kanagawa (JP); Tomoaki Sugawara, Kanagawa (JP); Junichiro Natori, Kanagawa (JP); Mayuka Araumi, Tokyo (JP); Takahiro Imai, Tokyo (JP); Megumi Kitamura, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 190 days.

(21) Appl. No.: 15/339,021

(22) Filed: Oct. 31, 2016

(65) Prior Publication Data
US 2017/0149357 A1 May 25, 2017

(30) Foreign Application Priority Data
Nov. 20, 2015 (JP) .................................. 2015-228082

(51) Int. Cl.
*H02N 1/00* (2006.01)
*H02N 1/04* (2006.01)
*F03G 7/08* (2006.01)

(52) U.S. Cl.
CPC ................. *H02N 1/00* (2013.01); *F03G 7/08* (2013.01); *H02N 1/04* (2013.01)

(58) Field of Classification Search
CPC .. H02N 1/00; H02N 1/04; H02N 2/00; H02N 2/18; H02N 2/186; F03G 7/08; F03G 7/00
(Continued)

(56) References Cited

U.S. PATENT DOCUMENTS

2005/0088310 A1* 4/2005 Sakai .................... H02N 2/183
310/36
2008/0174120 A1* 7/2008 Gardner ................. H02K 35/02
290/1 C
(Continued)

FOREIGN PATENT DOCUMENTS

| JP | 2011-517277 | 5/2011 |
|---|---|---|
| JP | 2016-103967 | 6/2016 |
| WO | WO2009/127823 A2 | 10/2009 |

OTHER PUBLICATIONS

Kozue Kobayashi, "Vibration of Large Truck Deck", Motor Ring, No. 35, pp. 1-3, 2012, Society of Automotive Engineers of Japan, 4 pgs.
(Continued)

*Primary Examiner* — Michael Andrews
(74) *Attorney, Agent, or Firm* — Oblon, McClelland, Maier & Neustadt, L.L.P.

(57) ABSTRACT

A power generating element is provided. The power generating element includes an electrode pair and an intermediate layer. The electrode pair includes a first electrode and a second electrode. The intermediate layer is disposed between the first electrode and the second electrode. The intermediate layer is insulating and has a first side facing the first electrode and a second side facing the second electrode. The first electrode and the intermediate layer together oper-
(Continued)

ate as a contact/separation mechanism configured to perform a contact/separation operation, when an external force is applied to the power generating element to generate power. In the contact/separation operation, the contact/separation mechanism transitions between a contact or close state in which the first electrode and the first side are brought into contact with each other or close to each other, and a separation state in which the first electrode and the first side are separated from each other.

13 Claims, 14 Drawing Sheets

(58) Field of Classification Search
USPC .......................................................... 310/300
See application file for complete search history.

(56) References Cited

U.S. PATENT DOCUMENTS

2014/0338458 A1* 11/2014 Wang ..................... H02N 1/04
　　　　　　　　　　　　　　　　　　　　　　　　　310/309
2017/0214338 A1* 7/2017 Otagiri .................... H02N 1/04

OTHER PUBLICATIONS

Extended European Search Report dated Apr. 18, 2017 in European Patent Application No. 16196897.9.

* cited by examiner

FIG. 8
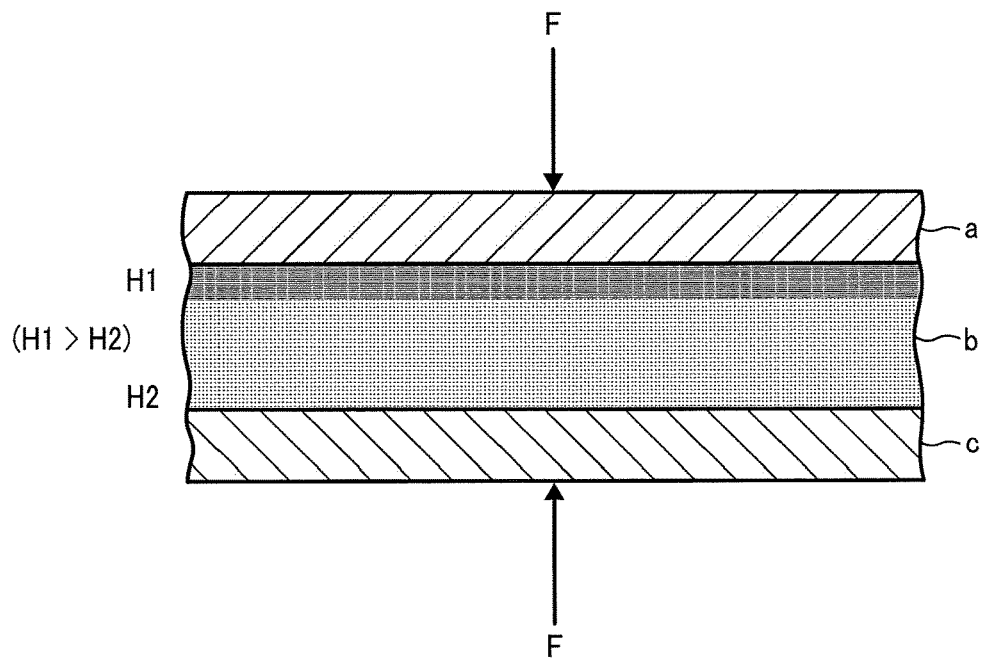
FIG. 9A          FIG. 9B
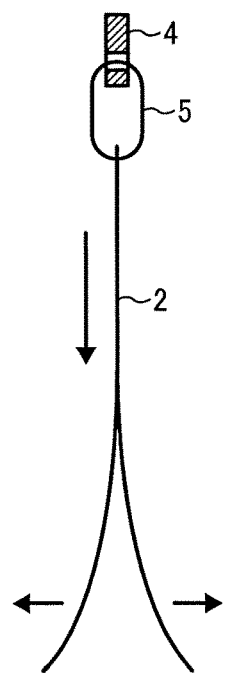    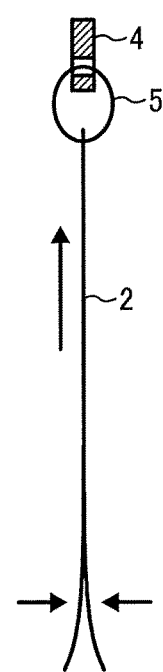

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

COMPARATIVE
EXAMPLE 1

POWER GENERATING ELEMENT AND POWER GENERATING DEVICE UTILIZING VIBRATION ENERGY

CROSS-REFERENCE TO RELATED APPLICATIONS

This patent application is based on and claims priority pursuant to 35 U.S.C. § 119(a) to Japanese Patent Application No. 2015-228082, filed on Nov. 20, 2015 in the Japan Patent Office, the entire disclosure of which is hereby incorporated by reference herein.

BACKGROUND

Technical Field

The present disclosure relates to a power generating element and a power generating device.

Description of the Related Art

There have been attempts to effectively utilize vibration energy. Vibration energy is generally generated from vibrations caused by structural bodies (e.g., roads, bridges, and buildings) and traveling bodies (e.g., automobiles such as trucks, and railroad vehicles).

As one method of effectively utilizing such environmental vibration energy, a method of converting vibration energy into electric energy is known.

Specifically, a method using a piezoelectric element, a method using electrostatic induction, and a method using electromagnetic induction are known.

SUMMARY

In accordance with some embodiments of the present invention, a power generating element is provided. The power generating element includes an electrode pair and an intermediate layer. The electrode pair includes a first electrode and a second electrode. The intermediate layer is disposed between the first electrode and the second electrode. The intermediate layer is insulating and has a first side facing the first electrode and a second side facing the second electrode. The first electrode and the intermediate layer together operate as a contact/separation mechanism configured to perform a contact/separation operation, when an external force is applied to the power generating element to generate power. In the contact/separation operation, the contact/separation mechanism transitions between a contact or close state in which the first electrode and the first side are brought into contact with each other or close to each other, and a separation state in which the first electrode and the first side are separated from each other.

In accordance with some embodiments of the present invention, a power generating device is provided. The power generating device includes the above power generating element and a suspension member. The suspension member suspends the power generating element such that the contact/separation operation is performed when the power generating element receives a vibration as the external force.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a cross-sectional view of an element including a surface-modified inactivated intermediate layer according to an embodiment of the present invention;

FIGS. 9A and 9B are schematic views of a power generating element according to an embodiment of the present invention, in a separation state and a contact state, respectively;

Figure 1:
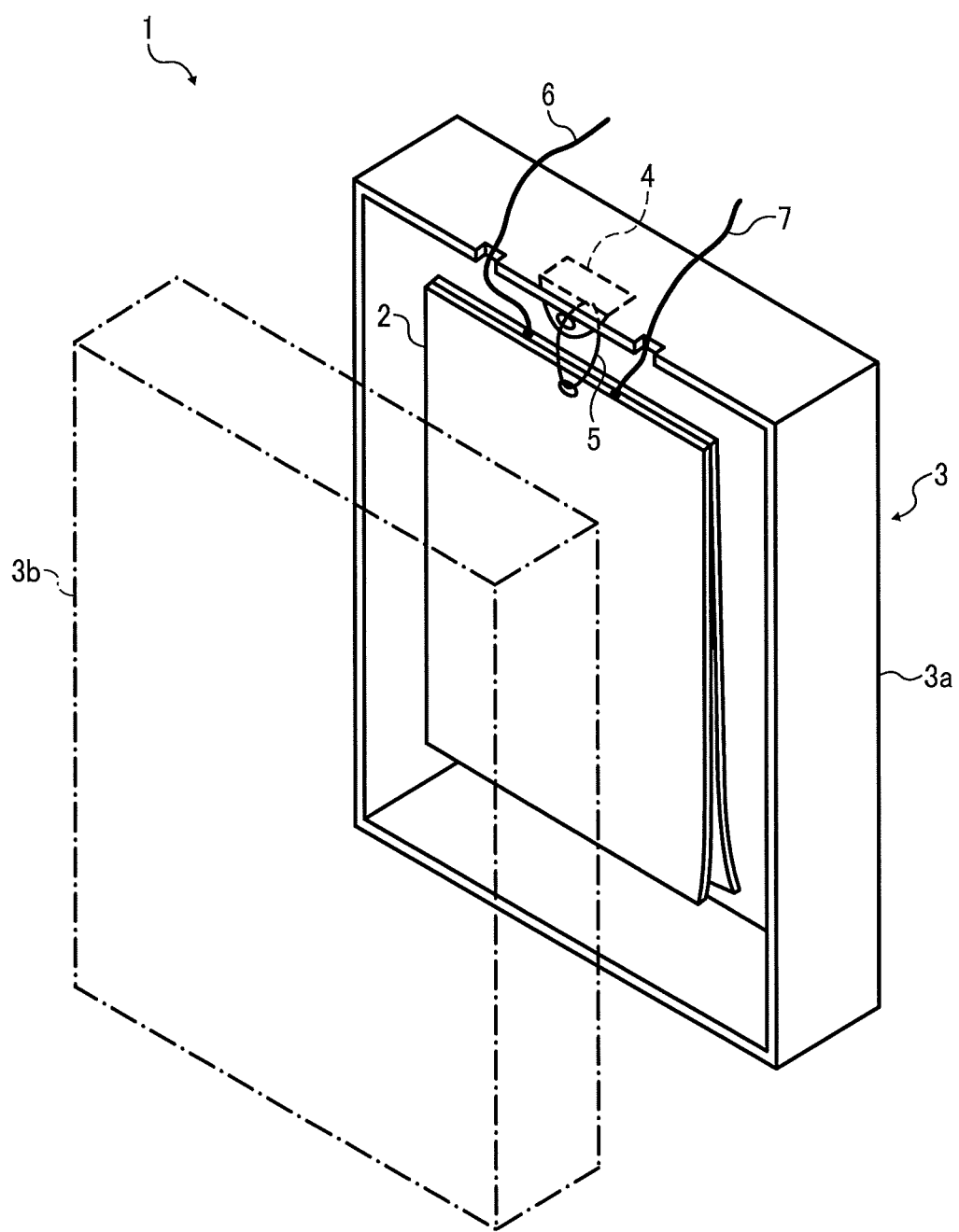
FIG. 1 is a perspective view of a power generating device according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Within the context of the present disclosure, if a first layer is stated to be "overlaid" on, or "overlying" a second layer, the first layer may be in direct contact with a portion or all of the second layer, or there may be one or more intervening layers between the first and second layer, with the second layer being closer to the substrate than the first layer.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

In accordance with some embodiments of the present invention, a power generating element is provided which effectively generates power using environmental vibration energy within all the frequency range without adjusting the resonant frequency. The power generating element is capable of reducing cost, since a resonant frequency adjuster is needless.

As an example, environmental vibration energy generated from vibration of truck decks can be used for generating power. In this case, the source of vibration could be the engine of a truck, irregularities on roadway surface, or an acceleration load caused by drive operations (e.g., acceleration, brake, or steering wheel operation).

Figure 5:
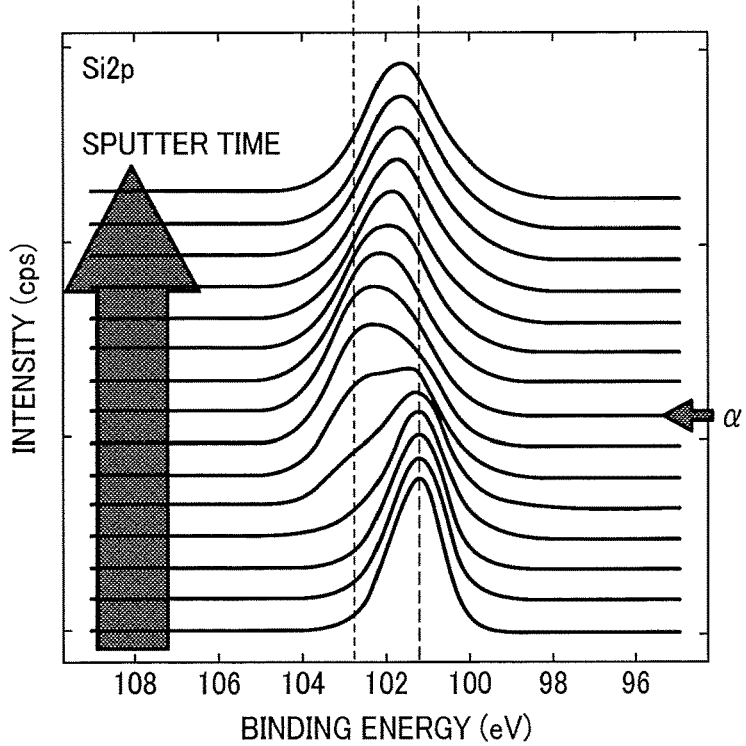
FIG. 5 is a graph showing a variation in the Si2p binding energy of the intermediate layer used to obtain the chart of FIG. 4 in the thickness direction.
Figure 17:
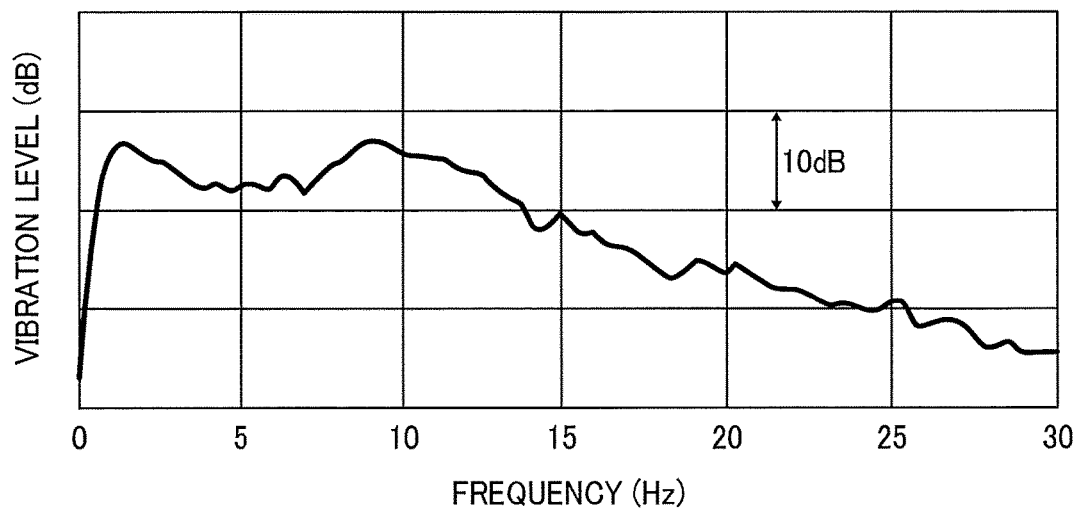
FIG. 17 is a graph showing a frequency characteristic of a vibration caused by a large truck deck.

FIG. 17 is a graph showing a power spectrum density (vibration frequency distribution) of a large truck deck, disclosed as FIG. 5 in, Kozue Kobayashi, "Vibration of Large Truck Deck", *Motor Ring*, No. 35, 2012, Society of Automotive Engineers of Japan. As illustrated in FIG. 17, the vibration frequency distribution of the large truck is a wideband spectrum distributed over the low-frequency range, not a single frequency spectrum.

It has been difficult for conventional power generating devices to use environmental vibration energy within all the frequency range. When the usable frequency range is largely deviated from the vibration frequency, only a part of the vibration energy can be used, resulting in poor power generation efficiency. In particular, conventional electromagnetic power generative devices are less expected to effectively generate power using a vibration within a low-frequency range, such as a vibration of a truck deck, since the power generation output is proportional to the square of the traveling speed.

A first embodiment of the present invention is described below with reference to FIGS. 1 to 9. Referring to FIG. 1, a power generating device 1 includes a power generating element 2 and a casing 3 within which the power generating element 2 is suspended. The casing 3 includes a casing main body 3a and a lid 3b. The casing main body 3a stores the power generating element 2, and the lid 3b is fastenable on the casing main body 3a.

A hook 4 is formed on an upper end part of the casing main body 3a. The power generating element 2 is suspended from the hook 4 via a looped string 5 serving as a suspension member. Lead wires 6 and 7 are connected to the power generating element 2 to extract electric power from the power generating element 2.

Figure 2A:
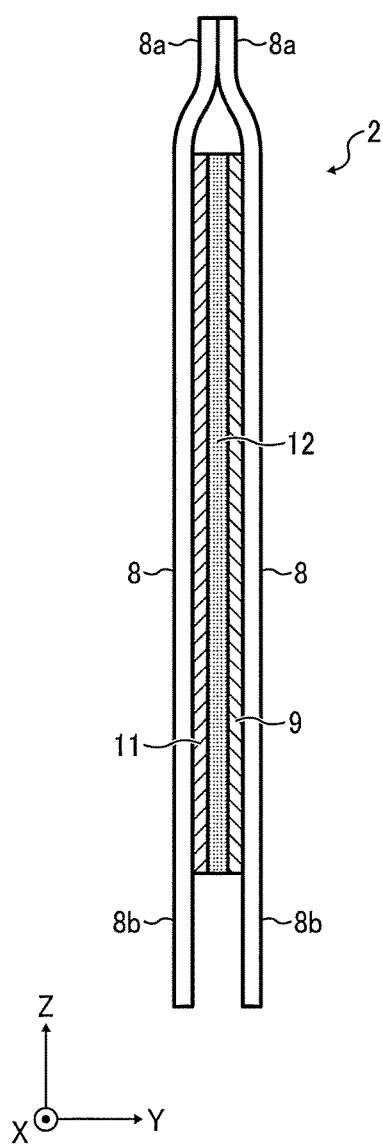
FIG. 2A is a cross-sectional view of a power generating element according to an embodiment of the present invention, in a closed state.
Figure 2B:
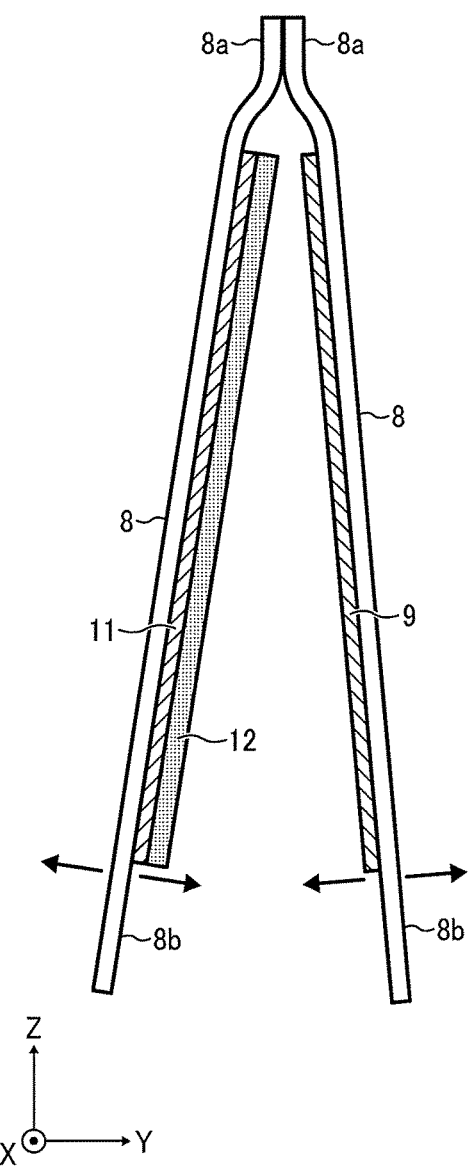
FIG. 2B is a cross-sectional view of the power generating element in an open state, taken from line A-A of FIG. 3.

Referring to FIGS. 2A and 2B, the power generating element 2 includes two cover members 8 that are insulating, a first electrode 9, a second electrode 11, and an intermediate layer 12 that is insulating. The first electrode 9 is secured to an inner side of one of the cover members 8. The second electrode 11 is secured to an inner side of the other one of the cover members 8. The intermediate layer 12 is secured to one side of the second electrode 11 which faces the first electrode 9. The first electrode 9 and the second electrode 11 form an electrode pair. The intermediate layer 12 is disposed between the first electrode 9 and the second electrode 11.

Each cover member 8 has an upper end part 8a and a lower end part 8b. The upper end parts 8a are bonded to each other by means of laminating, while the lower end parts 8b are free.

The intermediate layer 12 is not secured to the first electrode 9. Thus, when an external force acts on the power generating element 2, the cover members 8 are swingable about the upper end parts 8a in Y direction (front-back direction) that is perpendicular to Z direction (vertical direction), as illustrated in FIG. 2B.

One side of the intermediate layer 12 can be brought into contact with or close to the first electrode 9. In addition, the one side of the intermediate layer 12 can be separated from the first electrode 9.

Figure 3:
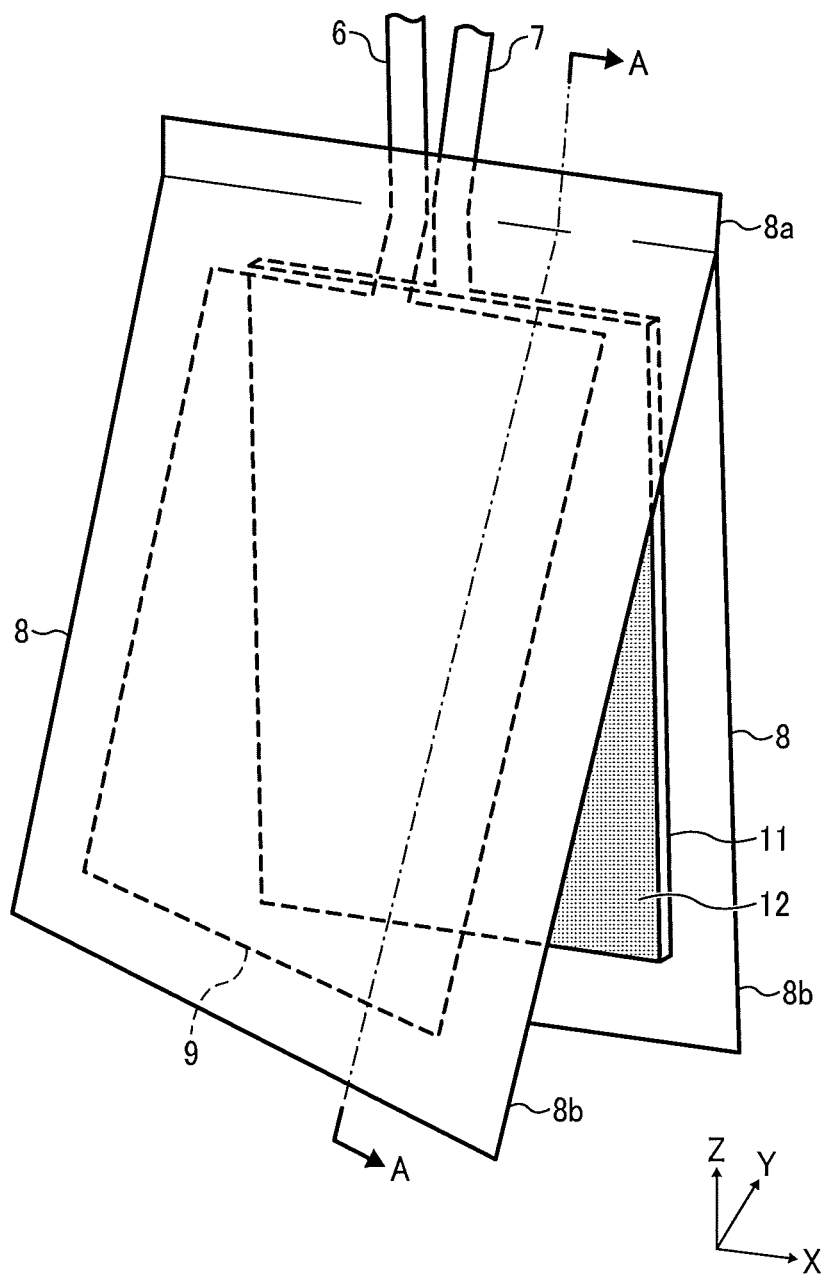
FIG. 3 is a perspective view of a power generating element according to an embodiment of the present invention, in an open state.

FIG. 3 is a perspective view of the power generating element 2 in a state in which the intermediate layer 12 and the first electrode 9 are separated from each other (hereinafter "separation state"). In FIG. 3, some members are illustrated omitting the thicknesses thereof.

The intermediate layer 12 includes a surface-modified silicone rubber. Specifically, one side of the intermediate layer 12 has been surface-modified so that, when a deformation imparting force is applied to the power generating element 2, both sides of the intermediate layer 12, respectively facing the first electrode 9 and the second electrode 11, deform at different degrees of deformation, to cause power generation.

First Electrode and Second Electrode

The first electrode 9 and the second electrode 11 are not limited in material, shape, size, and structure.

The first electrode 9 and the second electrode 11 are either common or different in material, shape, size, and/or structure. Preferably, the first electrode 9 and the second electrode 11 are common in these properties.

Specific examples of materials used for the first electrode 9 and the second electrode 11 include, but are not limited to, metals, carbon-based conductive materials, and conductive rubber compositions.

Specific examples of the metals include, but are not limited to, gold, silver, copper, aluminum, stainless steel, tantalum, nickel, and phosphor bronze. Specific examples of the carbon-based conductive materials include, carbon nanotube, carbon fibers, and graphite. Specific examples of the conductive rubber compositions include, but are not limited to, a composition including a conductive filler and a rubber.

Specific examples of the conductive filler include, but are not limited to, carbon materials (e.g., Ketjen black, acetylene black, graphite, carbon fiber (CF), carbon nanofiber (CNF), carbon nanotube (CNT), graphene), metal fillers (e.g., gold, silver, platinum, copper, aluminum, nickel), conductive polymeric materials (e.g., derivatives of polythiophene, polyacetylene, polyaniline, polypyrrole, polyparaphenylene, or polyparaphenylene vinylene, to which a dopant, such as anion and cation, may be added), and ionic liquids. Each of these materials can be used alone or in combination with others.

Specific examples of the rubber include, but are not limited to, silicone rubber, modified silicone rubber, acrylic rubber, chloroprene rubber, polysulfide rubber, urethane rubber, isobutyl rubber, fluorosilicone rubber, ethylene rubber, natural rubber (latex), ethylene propylene rubber, nitrile rubber, and fluorine rubber. Each of these materials can be used alone or in combination with others.

The first electrode 9 and the second electrode 11 may be in the form of a thin film. The first electrode 9 and the second electrode 11 may be made of woven fabric, non-woven fabric, knit fabric, mesh, sponge, or non-woven fabric formed by layering fibrous carbon materials.

The first electrode 9 and the second electrode 11 preferably have an average thickness in the range of from 0.01 μm to 1 mm, more preferably from 0.1 to 500 μm, from the aspect of conductivity and flexibility. When the average thickness is 0.01 μM or more, the mechanical strength becomes appropriate and the conductivity improves. When the average thickness is 1 mm or less, the element becomes deformable, thus providing good power generation performance.

Intermediate Layer

The intermediate layer 12 has flexibility.

The intermediate layer 12 satisfies at least one of the following conditions (1) and (2).

Condition (1): When a pressure is applied to the intermediate layer 12 from a direction perpendicular to the plane of the intermediate layer 12, the amount of deformation of a first side of the intermediate layer 12 facing the first electrode 9 and that of a second side of the intermediate layer 12 facing the second electrode 11 are different.

Condition (2): The universal hardness (H1) of the first side of the intermediate layer 12 facing the first electrode 9 and the universal hardness (H2) of the second side of the intermediate layer 12 facing the second electrode 11 are different, when the indentation depth is 10 μm.

As the amount of deformation or the hardness is different between both sides of the intermediate layer 12, a large amount of power can be generated.

Here, the amount of deformation is defined as the maximum indentation depth of an indenter, when the indenter is pressed against the intermediate layer 12 under the following conditions.

Measurement Conditions

Measuring instrument: Microhardness tester WIN-HUD available from Fischer

Indenter: Quadrangular diamond indenter having a facing angle of 136°

Initial load: 0.02 mN

Maximum load: 1 mN

Load increasing time from initial load to maximum load: 10 seconds

The universal hardness is measured under the following conditions.

Measurement Conditions

Measuring instrument: Microhardness tester WIN-HUD available from Fischer

Indenter: Quadrangular diamond indenter having a facing angle of 136°

Indentation depth: 10 μm

Initial load: 0.02 mN

Maximum load: 100 mN

Load increasing time from initial load to maximum load: 50 seconds

The ratio (H1/H2) of the universal hardness (H1) to the universal hardness (H2) is preferably 1.01 or more, more preferably 1.07 or more, and most preferably 1.13 or more. The upper limit of the ratio (H1/H2) is variable according to the degree of flexibility required by the use condition and/or the load applied in the use condition. However, the ratio (H1/H2) is preferably 1.70 or less. The universal hardness (H1) is a hardness of a relatively hard surface. The universal hardness (H2) is a hardness of a relatively soft surface.

Specific examples of materials used for the intermediate layer 12 include, but are not limited to, rubbers and rubber compositions. Specific examples of the rubbers include, but are not limited to, silicone rubber, fluorosilicone rubber, acrylic rubber, chloroprene rubber, natural rubber (latex), urethane rubber, fluorine rubber, and ethylene propylene rubber. Each of these materials can be used alone or in combination with others. Among these rubbers, silicone rubber is preferable.

The silicone rubber is not limited in structure so long as organosiloxane bonds are included. Specific examples of the silicone rubber include, but are not limited to, dimethyl silicone rubber, methyl phenyl silicone rubber, modified (e.g., acrylic-modified, alkyd-modified, ester-modified, epoxy-modified) silicone rubber. Each of these materials can be used alone or in combination with others.

Specific examples of the rubber compositions include, but are not limited to, a composition including a filler and at least one of the above-described rubbers. Among these rubber compositions, a silicone rubber composition including the above-described silicone rubbers is preferable.

The filler may be either an organic filler, an inorganic filler, or an organic-inorganic composite filler. Any organic compounds can be used as the organic filler. Specific examples of the organic filler include, but are not limited to, fine particles of acrylic resin, melamine resin, or fluororesin (e.g., polytetrafluoroethylene), silicone powder (e.g., silicone resin powder, silicone rubber powder, silicone composite powder), rubber powder, wood powder, pulp, and starch. Any inorganic compounds can be used as the inorganic filler.

Specific examples of the inorganic filler include, but are not limited to, oxides, hydroxides, carbonates, sulfates, silicates, nitrides, carbons, metals, and other compounds.

Specific examples of the oxides include, but are not limited to, silica, diatom earth, alumina, zinc oxide, titanium oxide, iron oxide, and magnesium oxide.

Specific examples of the hydroxides include, but are not limited to, aluminum hydroxide, calcium hydroxide, and magnesium hydroxide.

Specific examples of the carbonates include, but are not limited to, calcium carbonate, magnesium carbonate, barium carbonate, and hydrotalcite.

Specific examples of the sulfates include, but are not limited to, aluminum sulfate, calcium sulfate, and barium sulfate.

Specific examples of the silicates include, but are not limited to, calcium silicate (e.g., wollastonite, xonotlite), zirconia silicate, kaolin, talc, mica, zeolite, pearlite, bentonite, montmorillonite, sericite, activated clay, glass, and hollow glass beads.

Specific examples of the nitrides include, but are not limited to, aluminum nitride, silicon nitride, and boron nitride.

Specific examples of the carbons include, but are not limited to, Ketjen black, acetylene black, graphite, carbon fiber, carbon nanofiber, carbon nanotube, fullerene (and derivatives thereof), and graphene.

Specific examples of the metals include, but are not limited to, gold, silver, platinum, copper, iron, aluminum, and nickel.

Specific examples of the other compounds include, but are not limited to, potassium titanate, barium titanate, strontium titanate, lead zirconate titanate, silicon carbide, and molybdenum sulfide. The inorganic filler may be surface-treated.

As the organic-inorganic composite filler, a compound in which an organic compound and an inorganic compound are combined on the molecular level may be used.

Specific examples of the organic-inorganic composite filler include, but are not limited to, silica-acrylic composite particles and silsesquioxane.

The filler preferably has an average particle diameter in the range of from 0.01 to 30 μm, more preferably from 0.1 to 10 μm. When the average particle diameter is 0.01 μm or more, power generation performance may be improved. When the average particle diameter is 30 μm or less, the intermediate layer 12 becomes deformable, thus improving power generation performance.

The average particle diameter can be measured by a known particle size distribution analyzer, such as MICROTRACK HRA (available from Nikkiso Co., Ltd.), by a known method.

The content of the filler in the rubber composition is preferably in the range of from 0.1 to 100 parts by mass, more preferably from 1 to 50 parts by mass, based on 100 parts by mass of the rubber. When the content is 0.1 parts by mass or more, power generation performance may be improved. When the content is 100 parts by mass or less, the intermediate layer 12 becomes deformable, thus improving power generation performance.

The rubber composition may further include other components, such as an additive. The contents of the other components may be appropriately determined so long as the effect of the present invention is not damaged.

Specific examples of the additive include, but are not limited to, a cross-linker, a deterioration preventer, a heat resistant agent, and a colorant.

Materials used for the intermediate layer 12 may be prepared by any known method. For example, the rubber composition may be prepared by mixing the rubber, the filler, and other optional components, and kneading the mixture.

The intermediate layer 12 may be formed by any known method. For example, a thin layer of the rubber composition may be formed by hardening the rubber composition, coated on a substrate by means of blade coating, die coating, or dip coating, with heat or electron beam.

The intermediate layer 12 preferably has an average thickness in the range of from 1 μm to 10 mm, more preferably from 20 μm to 1 mm, from the aspect of deformation following property. When the average thickness is within the above preferable range, the intermediate layer 12 can exhibit sufficient film formation property without inhibiting deformation property, thus providing good power generation performance.

Preferably, the intermediate layer 12 has insulation property. More specifically, the intermediate layer 12 preferably has a volume resistivity of $10^8$ Ωcm or more, more preferably $10^{10}$ Ωcm or more. The intermediate layer 12 may have a multi-layered structure.

Surface Modification Treatment and Inactivation Treatment

As methods for making both sides of the intermediate layer 12 different in the amount of deformation or hardness, a surface modification treatment or an inactivation treatment may be employed. Such a treatment may be performed for either both sides or one side of the intermediate layer 12.

Surface Modification Treatment

Specific examples of the surface modification treatment include, but are not limited to, plasma treatment, corona discharge treatment, electron irradiation treatment, ultraviolet irradiation treatment, ozone treatment, and radiation (e.g., X-ray, α-ray, β-ray, γ-ray, neutron ray) irradiation treatment. From the aspect of processing speed, plasma treatment, corona discharge treatment, and electron irradiation treatment are preferable. The surface modification treatment is not limited to any particular treatment so long as a certain degree of irradiation energy is sufficiently provided to modify a material.

Plasma Treatment

Plasma generators for use in the plasma treatment may be of parallel plate type, capacitive coupling type, or inductive coupling type. In addition, atmospheric pressure plasma generators may also be used for the plasma treatment. In particular, a reduced-pressure plasma treatment is preferable from the aspect of durability.

The reaction pressure in the plasma treatment is preferably in the range of from 0.05 to 100 Pa, and more preferably from 1 to 20 Pa.

As the reaction atmosphere in the plasma treatment, inert gas, rare gas, and oxygen gas are suitable. In particular, argon is preferable from the aspect of persistence of the effect.

The reaction atmosphere preferably has an oxygen partial pressure of 5,000 ppm or less. When the reaction atmosphere has an oxygen partial pressure of 5,000 ppm or less, generation of ozone is suppressed and the use of an ozone treatment equipment is reduced.

In the plasma treatment, the amount of irradiation electric energy, defined by the product of output and irradiation time, is preferably in the range of from 5 to 200 Wh, more preferably from 10 to 50 Wh. When the amount of irradiation electric energy is within the above preferable range, the intermediate layer 12 is given a power generation function without degrading durability by excessive irradiation.

Corona Discharge Treatment

In the corona discharge treatment, the amount of applied (accumulated) energy is preferably in the range of from 6 to 300 J/cm$^2$, more preferably from 12 to 60 J/cm$^2$. When the amount of applied energy is within the above preferable range, the intermediate layer 12 is given a power generation function without degrading durability by excessive irradiation.

Electron Irradiation Treatment

In the electron irradiation treatment, the irradiation amount is preferably 1 kGy or more, and more preferably in the range of from 300 kGy to 10 MGy. When the irradiation amount is within the above preferable range, the intermediate layer 12 is given a power generation function without degrading durability by excessive irradiation.

As the reaction atmosphere in the electron irradiation treatment, an inert gas (e.g., argon gas, neon gas, helium gas, nitrogen gas) having an oxygen partial pressure of 5,000 ppm or less is preferable. When the reaction atmosphere has an oxygen partial pressure of 5,000 ppm or less, generation of ozone is suppressed and the use of an ozone treatment equipment is reduced.

Ultraviolet Irradiation Treatment

In the ultraviolet irradiation treatment, the ultraviolet ray preferably has a wavelength of from 200 to 365 nm, more preferably from 240 to 320 nm.

In the ultraviolet irradiation treatment, the accumulated amount of light is preferably in the range of from 5 to 500 J/cm², more preferably from 50 to 400 J/cm². When the accumulated amount of light is within the above preferable range, the intermediate layer 12 is given a power generation function without degrading durability by excessive irradiation.

As the reaction atmosphere in the ultraviolet irradiation treatment, an inert gas (e.g., argon gas, neon gas, helium gas, nitrogen gas) having an oxygen partial pressure of 5,000 ppm or less is preferable. When the reaction atmosphere has an oxygen partial pressure of 5,000 ppm or less, generation of ozone is suppressed and the use of an ozone treatment equipment is reduced.

There is a conventional technology for improving an interlayer adhesion force by forming active groups by means of excitation or oxidization caused by a plasma treatment, corona discharge treatment, ultraviolet irradiation treatment, or electron irradiation treatment. However, such a technology has a limited application to improvement of interlayer adhesion force. It is known that application of that technology to outermost surface modification treatments causes a significant deterioration in releasability of the outermost surface, which is not preferable. Moreover, in that technology, a reactive active group (e.g., hydroxyl group) is efficiently introduced under an oxygen-rich reaction condition. That conventional technology is essentially different from the surface modification treatments in accordance with some embodiments of the present invention.

The plasma treatment, as an example of the surface modification treatment in accordance with some embodiments of the present invention, is performed under a reduced-pressure environment with a small amount of oxygen. Such a plasma treatment accelerates re-cross-linkage or recombination of the surface and increases the number of Si—O bonds having a high bond energy, improving the durability of the surface.

In addition, since the surface is densified owing to the increased cross linkage density, the releasability of the surface is also improved. Although active groups are formed in part, such active groups are inactivated by a coupling agent or an air drying treatment.

Inactivation Treatment

The surface of the intermediate layer 12 may be subjected to an inactivation treatment using any material.

The inactivation treatment is not limited to any particular process so long as the surface of the intermediate layer 12 is inactivated. For example, the inactivation treatment may include imparting an inactivator to the surface of the intermediate layer 12. Here, inactivation of the intermediate layer 12 refers to a phenomenon in which the nature of the surface of the intermediate layer 12 is changed to have less chemical reactivity. Specifically, the degree of activity of the surface of the intermediate layer 12 is reduced by reacting the surface with an inactivator with active groups (e.g., —OH groups) generated by excitation or oxidization caused by a plasma treatment, corona discharge treatment, ultraviolet irradiation treatment, or electron irradiation treatment.

Specific examples of the inactivator include, but are not limited to, an amorphous resin and a coupling agent. Specific examples of the amorphous resin include, but are not limited to a resin having a perfluoropolyether structure in its main backbone.

Specific examples of the coupling agent include, but are not limited to, a metal alkoxide, and a solution containing a metal alkoxide.

Specific examples of the metal alkoxide include, but are not limited to, a compound represented by the following formula (1), a partially-hydrolyzed polycondensate thereof having a polymerization degree of about 2 to 10, and a mixture thereof.

$$R^1_{(4-n)}Si(OR^2)_n \qquad (1)$$

In the formula (1), each of $R^1$ and $R^2$ independently represents a straight-chain or branched-chain alkyl group having 1 to 10 carbon atoms, an alkyl polyether chain, or an aryl group; and n represents an integer of from 2 to 4.

The inactivation treatment may be performed by, for example, subjecting a precursor (e.g., rubber) of the intermediate layer 12 to the surface modification treatment first, and then coating or impregnating (e.g., by means of dipping) the surface of the precursor of the intermediate layer 12 with an inactivator.

When a silicone rubber is used as the precursor of the intermediate layer 12, the silicone rubber may be subjected to the surface modification treatment first, and then left at rest in the air to be inactivated through air drying.

Preferably, the oxygen concentration profile of the intermediate layer 12 has a local maximum value in the thickness direction. Preferably, the carbon concentration profile of the intermediate layer 12 has a local minimum value in the thickness direction.

Preferably, in the intermediate layer 12, a position which indicates a local maximum value in the oxygen concentration profile is coincident with a position which indicates a local minimum value in the carbon concentration profile.

The oxygen concentration profile and the carbon concentration profile can be determined by X-ray photoelectron spectroscopy (XPS) under the following conditions.

Measurement Conditions

Measurement Device: ULVAC-PHI QUANTERA SXM available from ULVAC-PHI, Inc.

Measurement Light Source: Al (mono)

Measurement Output: 100 μm φ, 25.1 W

Measurement Area: 500 μm×300 μm

Pass Energy: 55 eV (narrow scan)

Energy Step: 0.1 eV (narrow scan)

Relative Sensitivity Factor: Relative sensitivity factor of PHI is used

Sputter Source: C60 Cluster ion

Ion Gun Output: 10 kV, 10 nA

Raster Control: (X=0.5, Y=2.0) mm

Sputter Rate: 0.9 nm/min (SiO₂ conversion)

XPS analyzes atomic composition and binding state of a target object by capturing electrons which escaped from the target object by the photoelectron effect.

Silicone rubbers have siloxane bonds. The major components of silicone rubbers include Si, O, and C. In a case in which the intermediate layer 12 is formed of a silicone rubber, the atomic composition of the intermediate layer 12 in the depth direction, in other words, the atomic concentration (%) distribution of the major atoms (Si, O, or C) ranging from the surface part to the inner part of the intermediate layer 12, can be determined from a relative peak strength ratio in a wide scan spectrum measured by XPS. One example of the wide scan spectrum is illustrated in FIG. 4.

Figure 4:
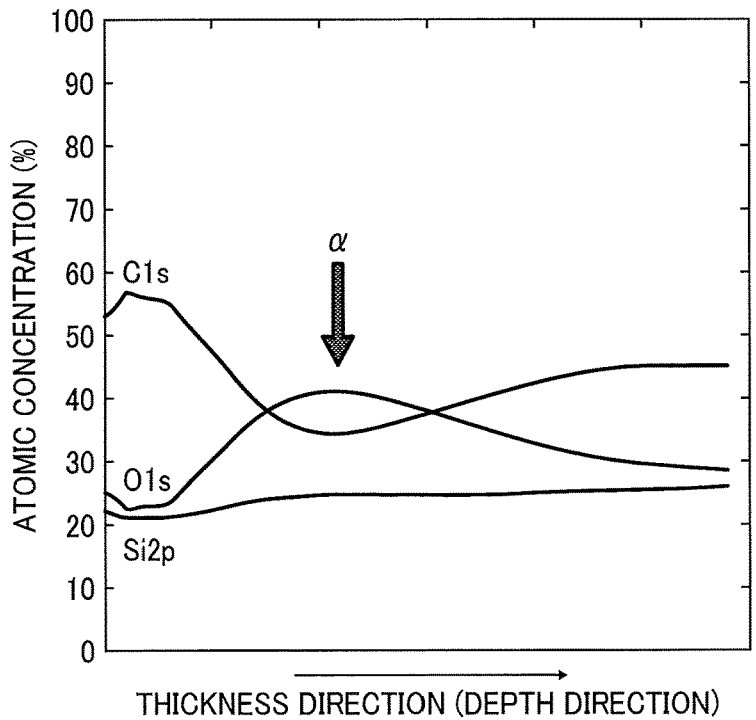
FIG. 4 is an XPS (X-ray photoelectron spectroscopy) chart of a surface-modified inactivated intermediate layer, formed of a silicone rubber, of a power generating device according to an embodiment of the present invention.

The spectrum illustrated in FIG. 4 is measured with one sample of the intermediate layer 12 which is prepared by subjecting a silicone rubber to the above-described plasma treatment (as the surface modification treatment) and the above-described inactivation treatment. In FIG. 4, the horizontal axis represents the analysis depth measured from the surface part toward the inner part, and the vertical axis represents the atomic concentration (%).

In the case of a silicone rubber, elements bound to silicon atoms and the binding state thereof can be determined by measuring the energy of electrons escaped form the Si2p orbit. Specifically, by separating peaks in a narrow scan spectrum of the Si2p orbit, which indicates binding state of Si, a chemical binding state of Si can be determined.

The result of peak separation is illustrated in FIG. 5. The graph illustrated in FIG. 5 was measured with the same sample of the intermediate layer 12 used to obtain the chart of FIG. 4. In FIG. 5, the horizontal axis represents binding energy, and the vertical axis represents intensity. Each curve represents a spectrum measured at each depth. A spectrum on a lower side indicates a greater (deeper) measurement depth.

It is generally known that the amount of peak shift depends on the binding state. In the case of the silicone rubber according to the present embodiment, the peak is shifted toward a high-energy side with respect to the Si2p orbit. This indicates that the amount of oxygen atoms bound to Si has been increased.

As the silicone rubber is subjected to the surface modification treatment and the inactivation treatment, the amount of oxygen is increased from the surface part toward the inner part while exhibiting a local maximum value, while the amount of carbon is decreased while exhibiting a local minimum value. As the silicone rubber is further analyzed in the depth direction, the amount of oxygen is decreased and the amount of carbon is increased to have the same atomic composition as an untreated silicone rubber.

The fact that the local maximum value in the oxygen concentration profile is detected at the position a in FIG. 4 is coincident with the fact that the Si2p binding energy is shifted to a high-energy side (as indicated by a in FIG. 5). This indicates that an increase of oxygen atoms is detected from the number of oxygen atoms bound to Si.

Figure 6:
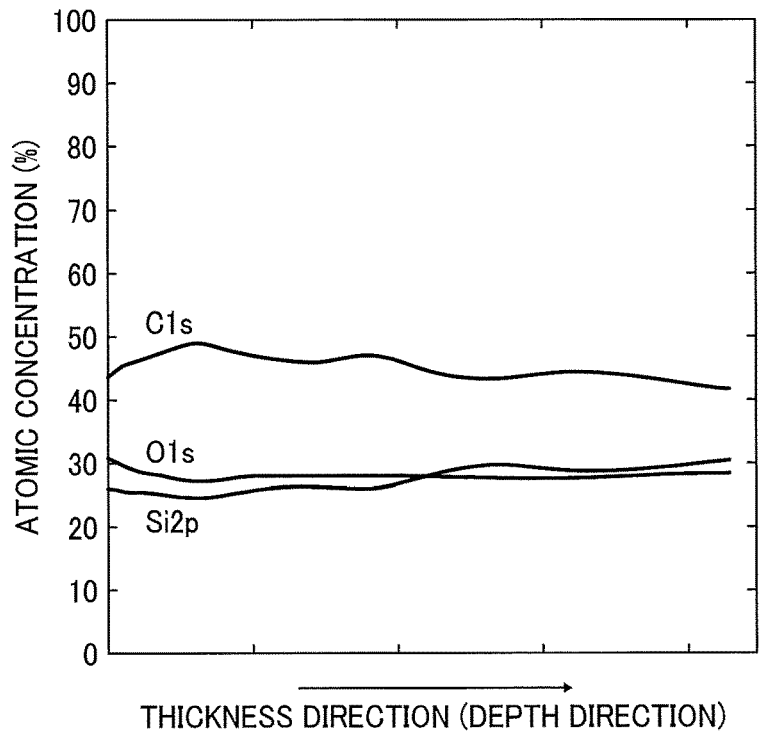
FIG. 6 is an XPS chart of an untreated intermediate layer, formed of a silicone rubber.
Figure 7:
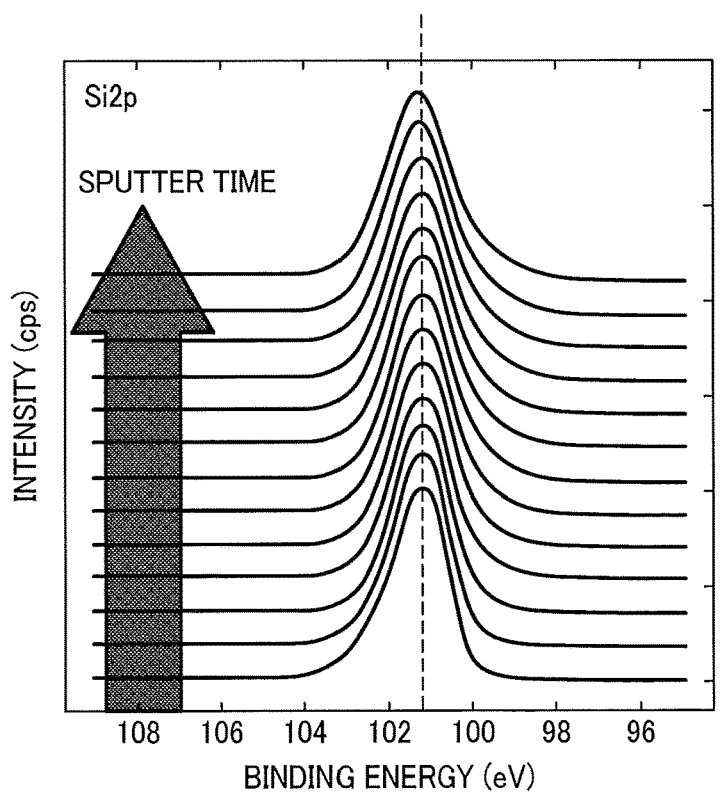
FIG. 7 is a graph showing a variation in the Si2p binding energy of the intermediate layer used to obtain the chart of FIG. 6 in the thickness direction.

FIGS. 6 and 7 show results for an untreated silicone rubber with respect to the same analysis performed to obtain graphs of FIGS. 4 and 5, respectively.

In FIG. 6, no local maximum value is observed in the oxygen concentration profile, and no local minimum value is observed in the carbon concentration profile, in contrast to FIG. 4. In addition, in FIG. 7, the Si2p binding energy is not shifted to a high-energy side. This indicates that the number of oxygen atoms bound to Si has not been changed.

As the surface of the intermediate layer 12 is coated or impregnated (e.g., by means of dipping) with the inactivator (e.g., a coupling agent), the inactivator gradually penetrates the intermediate layer 12. In a case in which the coupling agent is the compound represented by the formula (1), polyorganosiloxane will be distributed within the intermediate layer 12. The concentration distribution of oxygen atoms included in the polyorganosiloxane will exhibit a local maximum value in the depth direction.

As a result, the intermediate layer 12 comes to include polyorganosiloxane containing silicon atoms bound to 3 to 4 oxygen atoms.

The inactivation treatment are not limited to dipping, so long as oxygen atoms included in polyorganosiloxane are distributed such that the concentration distribution thereof exhibits a local maximum value in the depth direction (thickness direction). Specific examples of the inactivation treatment include, but are not limited to, plasma CVD (chemical vapor deposition), PVD (physical vapor deposition), sputtering, vacuum deposition, and combustion chemical vapor deposition.

The intermediate layer 12 needs not necessarily have an initial surface potential at rest. The initial surface potential at rest can be measured under the following conditions. Here, having no initial surface potential refers to having an initial surface potential of ±10 V or less, when measured under the following conditions.

Measurement Conditions

Pretreatment: Left at rest in an atmosphere having a temperature of 30° C. and a relative humidity of 40% for 24 hours and subjected to a neutralization for 60 seconds (using an instrument SJ-F300 available from Keyence Corporation).

Instrument: Treck Model 344
Measurement Probe: 6000B-7C
Measurement Distance: 2 mm
Measurement Spot Diameter: 10 mm Within the element according to the present embodiment, a bias in capacitance is caused upon a charging, the mechanism of which is similar to triboelectric charging, and a generation of surface potential difference due to inner charge retention, according to the difference in deformation amount between both sides of the intermediate layer 12 that is caused by the difference in hardness therebetween. It is considered that such a bias in capacitance causes charge transfer and further causes power generation.

Preferably, a space is provided between the intermediate layer 12 and at least one of the first electrode 9 and the second electrode 11, to increase the amount of power generation.

For example, such a space can be provided by disposing a spacer between the intermediate layer 12 and at least one of the first electrode 9 and the second electrode 11.

The spacer is not limited in material, configuration, shape, and size. Specific examples of materials used for the spacer include, but are not limited to, polymeric materials, rubbers, metals, conductive polymeric materials, and conductive rubber compositions.

Specific examples of the polymeric materials include, but are not limited to, polyethylene, polypropylene, polyethylene terephthalate, polyvinyl chloride, polyimide resin, fluororesin, and acrylic resin. Specific examples of the rubber include, but are not limited to, silicone rubber, modified silicone rubber, acrylic rubber, chloroprene rubber, polysulfide rubber, urethane rubber, isobutyl rubber, fluorosilicone rubber, ethylene rubber, and natural rubber (latex).

Specific examples of the metals include, but are not limited to, gold, silver, copper, aluminum, stainless steel, tantalum, nickel, and phosphor bronze. Specific examples of the conductive polymeric materials include, but are not limited to, polythiophene, polyacetylene, and polyaniline. Specific examples of the conductive rubber compositions include, but are not limited to, a composition including a conductive filler and a rubber. Specific examples of the conductive filler include, but are not limited to, carbon materials (e.g., Ketjen black, acetylene black, graphite, carbon fiber, carbon nanofiber, carbon nanotube, graphene), metal fillers (e.g., gold, silver, platinum, copper, iron, aluminum, nickel), conductive polymeric materials (e.g., derivatives of polythiophene, polyacetylene, polyaniline, polypyrrole, polyparaphenylene, or polyparaphenylene vinylene, to which a dopant, such as anion and cation, may be added), and ionic liquids.

Specific examples of the rubber include, but are not limited to, silicone rubber, modified silicone rubber, acrylic rubber, chloroprene rubber, polysulfide rubber, urethane rubber, isobutyl rubber, fluorosilicone rubber, ethylene rubber, and natural rubber (latex).

The spacer may be in the form of a sheet, film, woven fabric, non-woven fabric, mesh, or sponge.

The shape, size, thickness, and installation location of the spacer are appropriately determined according to the structure of the element.

In the embodiment illustrated in FIG. 8, the first electrode 9, the intermediate layer 12, and the second electrode 11 are indicated by symbols a, b, and c, respectively. In a case in which one side of the intermediate layer b which faces the first electrode a is subjected to the surface modification treatment or the inactivation treatment, the universal hardness H1 of that side of the intermediate layer b which faces the first electrode a becomes greater than the universal hardness H2 of the other side of the intermediate layer b which faces the second electrode c.

When a pressing force F is respectively applied to both sides of the intermediate layer b, the degree of deformation of one side of the intermediate layer b facing the first electrode a becomes smaller than that of the other side of the intermediate layer b facing the second electrode c.

Cover Member

The cover member 8 is not limited in material, shape, size, thickness, and structure. Specific examples of materials used for the cover member 8 include, but are not limited to, polymeric materials and rubbers.

Specific examples of the polymeric materials include, but are not limited to, polyethylene, polypropylene, polyethylene terephthalate, polyvinyl chloride, polyimide resin, fluororesin, and acrylic resin.

Specific examples of the rubbers include, but are not limited to, silicone rubber, fluorosilicone rubber, fluorine rubber, urethane rubber, acrylic rubber, chloroprene rubber, butyl rubber, ethylene propylene rubber, nitrile rubber, polysulfide rubber, and natural rubber (latex).

The intermediate layer 12 according to the present embodiment was prepared by mixing 100 parts by mass of a silicone rubber (TSE3033 available from Momentive Performance Materials Inc.), serving as a base material, and 40 parts by mass of barium titanate (93-5640 available from Wako Pure Chemical Industries, Ltd.), serving as an additive. The resulting mixture was applied onto a PET (polyethylene terephthalate) film (Lumirror® T60 #100) by blade coating, such that the resulting layer has an average thickness of 150±20 μm, a longitudinal length of 60 mm, and a lateral length of 40 mm. Thus, an intermediate layer precursor was prepared.

The intermediate layer precursor was burnt at about 120° C. for 30 minutes and then subjected to the above-described plasma treatment as the surface modification treatment.

As the first electrode 9 and the second electrode 11, a piece of an aluminum sheet having an average thickness of 12 μm (available from Mitsubishi Aluminum Co., Ltd., having an area of 50 mm×30 mm, with a lead extraction part having an area of 30 mm×5 mm) was used. As illustrated in FIG. 3, the first electrode 9 and the second electrode 11 sandwich the intermediate layer 12 without the lead extraction parts 6 and 7 thereof being overlapped with each other.

As the cover member 8, a laminate film (STANDARD TYPE having a thickness of 75 μm and an area of 70 mm×50 mm, available from Fellows, Inc.) was used.

In FIGS. 2A and 2B, the first electrode 9, the second electrode 11, the intermediate layer 12, and the cover member 8 are illustrated thicker than actual for clarification. In actual, the power generating element 2 is a thin member having a thickness of less than 240 μm at most.

When the power generating device 1 in mounted on a truck deck, a vibration (external force) generated while the truck is traveling is transmitted to the power generating element 2 via the casing 3 and the string 5, and the power generating element 2 is caused to vibrate in the vertical direction, as illustrated in FIGS. 9A and 9B.

The lower end part of the power generating element 2 is free, as described above. Therefore, when the power generating element 2 moves downward, the lower end part of the power generating element 2 is opened due to air resistance, thus separating the intermediate layer 12 and the first electrode 9 from each other (hereinafter "separation state"). When the power generating element 2 moves upward, the lower end part of the power generating element is closed due to air resistance, thus bringing the intermediate layer 12 and the first electrode 9 into contact with or close to each other (hereinafter "contact or close state").

As a result, complex charging of separation charging and triboelectric charging occurs at the interface between the first electrode 9 and the intermediate layer 12, thus generating charge. The amount of accumulated charge is thereby increased than when the first electrode 9 and the intermediate layer 12 are kept in contact with each other. The power generation amount is further increased through the repeated contact/separate operations. The charge polarity in the contact state is opposite from that in the separation state.

The surface-modified silicone rubber in the intermediate layer 12 considerably improves power generation efficiency under the above-described charging mechanism, compared to a silicone rubber without surface modification.

Figure 10:
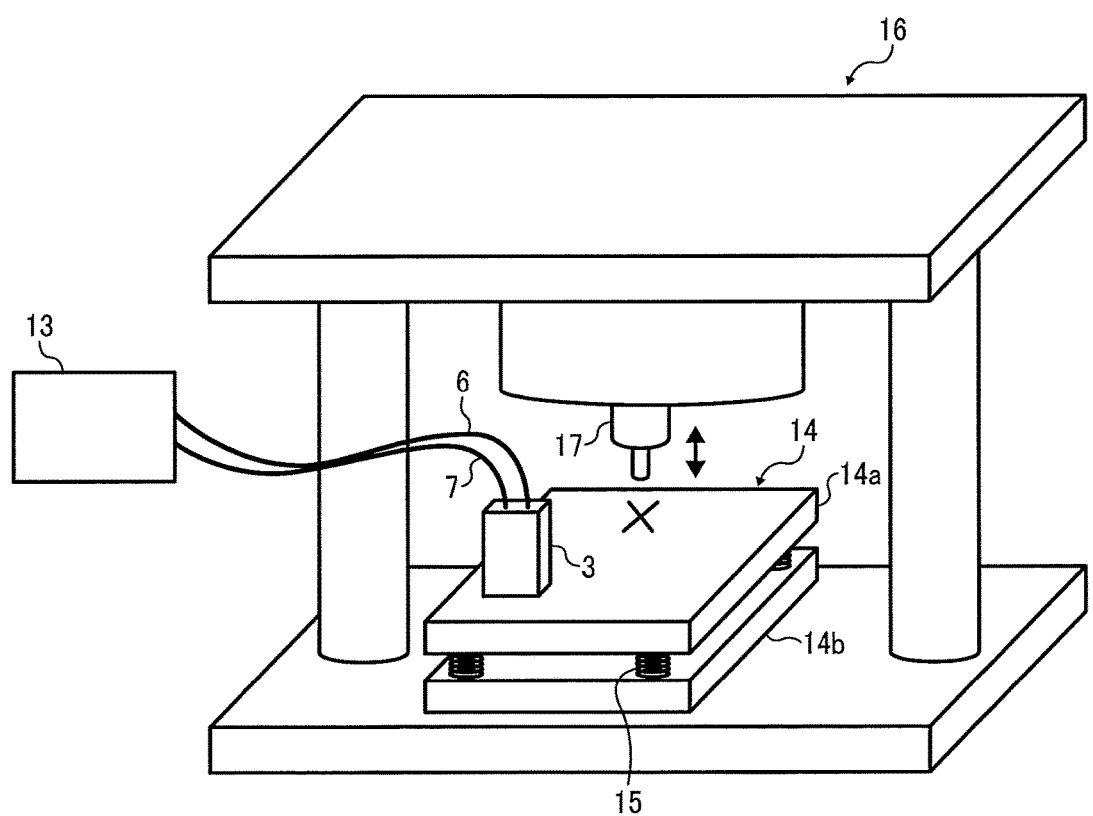
FIG. 10 is a perspective view of a vibration tester used in a vibration test.

A vibration test was performed under the following conditions to evaluate power generation amount of power generating elements varied in configuration or suspension condition. Evaluation Method As illustrated in FIG. 10, the power generating element 2 was stored in the casing 3 formed of a rectangular styrene casing (TYPE 7 available from AS ONE Corporation). Holes were formed on an upper part of the casing 3. The lead wires 6 and 7 were passed through the holes and connected to an oscilloscope 13 (Wave Ace 1001 available from Teledyne LeCroy, having a resistance of 1 MΩ).

The casing 3 was secured to a sample stage 14 with a double-sided adhesive tape. The sample stage 14 includes two acrylic plates 14a and 14b (each having a thickness of 3 mm and an area of 250 mm×250 mm, available from Kuraray Co., Ltd.) and four coil springs 15 (having a spring constant of 0.501 N/m, available from Showa Spring Co., Ltd.) disposed between the acrylic plates 14a and 14b at the four corners.

The sample stage 14 was vibrated by a vibration tester 16 (Fatigue Durability Tester FRDS20-RC available from Asahi Seisakusyo). Voltage generated by the vibration was read by the oscilloscope 13. Evaluation conditions were as follows.

Vibration Conditions

Displacement: 2±1 mm (The contact point of a vibration probe 17 of the vibration tester 16 with the sample stage 14 is defined as the zero point.)

Frequency: 15 Hz

Acceleration Rate: 0.9 G

As indicated in Table 1 (research results made by Nittsu Research Institute And Consulting), truck decks are capable of vibrating in all directions, i.e., vertical direction (Z direction), horizontal direction (X direction), and front-back direction (Y direction). In particular, vibrations in the vertical direction are so large that the acceleration rate of from 0.4 to 2.4 G is generated.

TABLE 1

| Transportation Means | Measurement Conditions | | | Acceleration Rate (G) | | |
|---|---|---|---|---|---|---|
| | | | | Vertical Direction | Horizontal Direction | Front-Back Direction |
| Truck | General Road | 20-40 km/h | Paved | 0.4-0.7 | 0.1-0.2 | 0.1-0.2 |
| | | | Unpaved | 1.3-2.4 | 0.4-1.0 | 0.5-1.5 |
| | Freeway | 80-100 km/h | Loaded | 0.6-1.0 | 0.2-0.5 | 0.1-0.4 |
| | | | Unloaded | 1.0-1.6 | 0.6-1.4 | 0.3-0.9 |
| | Getting across about 2-cm step | | | 1.6-2.5 | 1.0-2.4 | 1.1-2.3 |
| | Braking at 35 km/h | | | 0.2-0.7 | | 0.6-0.7 |
| Railway | Running | On Rail | | 0.1-0.4 | 0.1-0.2 | 0.1-0.2 |
| | | On Rail Joint | | 0.2-0.6 | 0.1-0.2 | 0.1-0.2 |
| | | Crash Stop | | 0.6-0.8 | 0.1-0.8 | 1.5-1.6 |
| | | Car Coupling | | 0.1-0.2 | 0.1-0.2 | 0.2-0.7 |
| | | Container Handling | | 2.5-4.5 | 1.0-2.5 | 1.0-1.5 |
| Aircraft | | Takeoff | | 0.2-0.5 | 0.1 | 0.1-0.2 |
| | | Landing | | 0.3-1.0 | 0.1-0.2 | 0.2-0.3 |
| | | Air Pocket | | 2.0-2.4 | | |

As is clear from FIG. 17 showing a vibration frequency distribution of a truck deck, vibration in the vertical direction is mostly distributed over a frequency range of from 3 to 25 Hz. The vibration frequency in the test was therefore set to the approximately middle value within this range.

Example 1

Figure 11A:
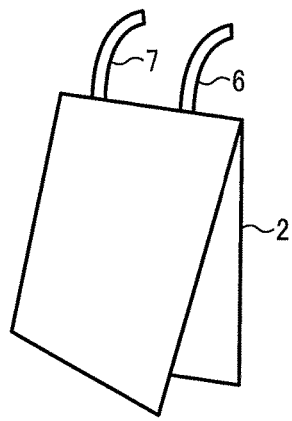
FIGS. 11A to 11F are schematic views illustrating suspension structures of the power generating elements according to Examples 1 to 6, respectively, in the vibration test.

As illustrated in FIG. 11A, the power generating element 2 was suspended by the two lead wires 6 and 7 fixed at different positions within the casing 3.

Example 2

Figure 11B:
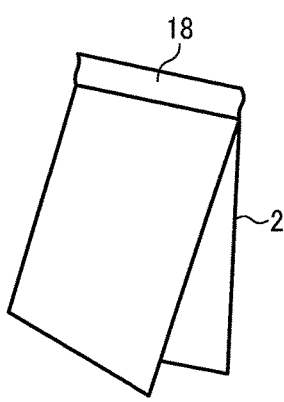

As illustrated in FIG. 11B, the power generating element 2 was fixed to an upper surface of the casing 3 in the width direction through a bonding surface 18, without fixing the lead wires 6 and 7.

Example 3

Figure 11C:
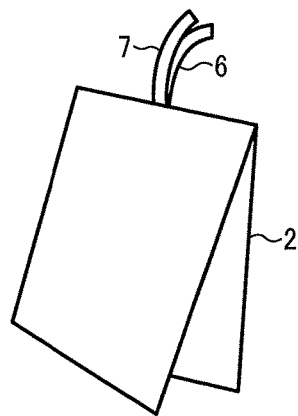

As illustrated in FIG. 11C, the power generating element 2 was suspended by the lead wires 6 and 7 put together at the upper center part of the power generating element 2.

Example 4

Figure 11D:
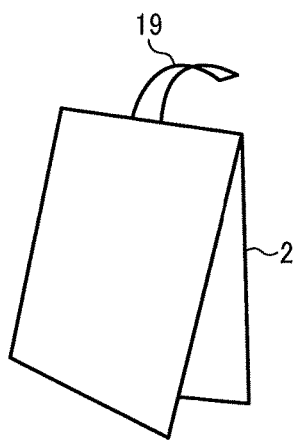

As illustrated in FIG. 11D, one end of a PET film 19 (Lumirror® T60 available from Toray Industries, Inc., having a thickness of 250 μm), having been cut into a piece with an area of 50 mm×20 mm), was attached to the power generating element 2 and the other end thereof was attached to an inner surface of the casing 3 such that the PET film 19 was curved into an arch.

Example 5

Figure 11E:
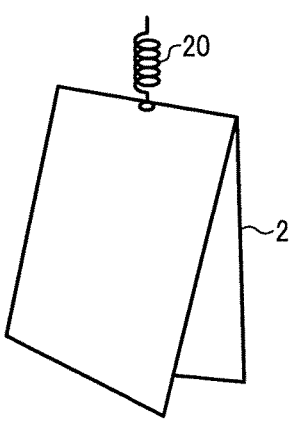

As illustrated in FIG. 11E, the power generating element 2 was suspended by a coil spring 20 suspended from the upper part of the casing 3, at the upper central part of the power generating element 2.

Example 6

Figure 11F:
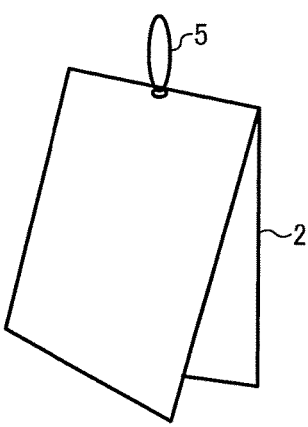

As illustrated in FIG. 11F, the power generating element 2 was suspended by the flexible string 5 at the upper central part of the power generating element 2.

Example 7

Figure 12A:
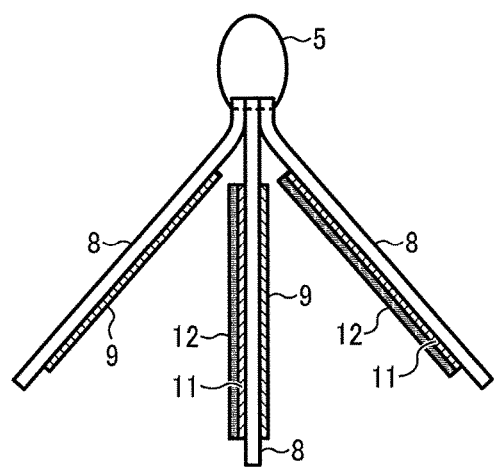
FIGS. 12A to 12C are schematic views illustrating suspension structures of the power generating elements according to Examples 7 to 9, respectively, in the vibration test.

As illustrated in FIG. 12A, two pairs of contact/separation mechanisms, each including the first electrode 9 and the intermediate layer 12, were provided, such that the surface-modified surfaces of the intermediate layers 12 faced in the same direction (left direction in FIG. 12A).

Example 8

Figure 12B:
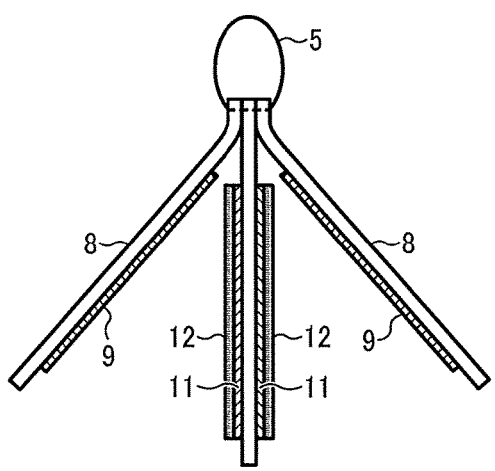

As illustrated in FIG. 12B, two pairs of contact/separation mechanisms, each including the first electrode 9 and the intermediate layer 12, were provided, such that the surface-modified surfaces of the intermediate layers 12 faced in the opposite directions.

Example 9

Figure 12C:
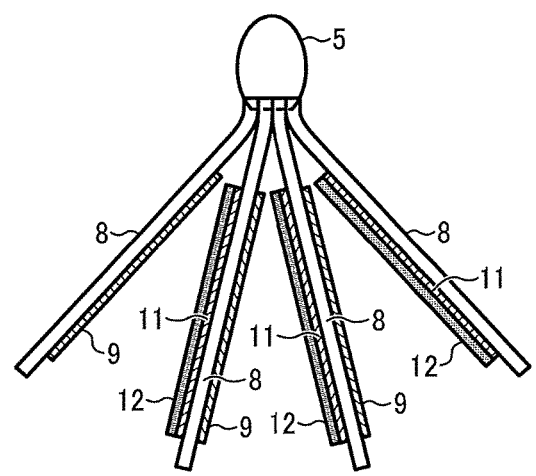

As illustrated in FIG. 12C, three pairs of contact/separation mechanisms, each including the first electrode 9 and the intermediate layer 12, were provided, such that the surface-modified surfaces of the intermediate layers 12 faced in the same direction (left direction in FIG. 12C).

Comparative Example 1

Figure 13A:
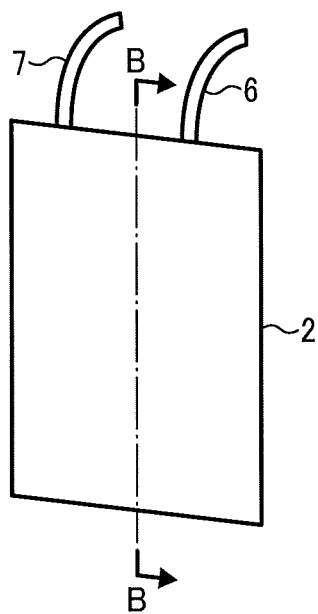
FIG. 13 A is a schematic view illustrating a suspension structure of the power generating element according to Comparative Example 1 in the vibration test.
FIG. 13B is a cross-sectional view taken from line B-B of FIG. 13A.
Figure 13B:
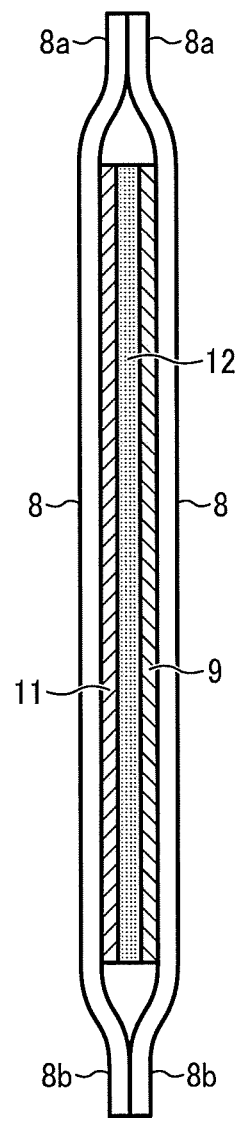

As illustrated in FIGS. 13A and 13B, the power generating element of Comparative Example 1 had the same configuration as that of Example 1 except that the cover members 8 were bonded together through the four sides thereof.

The evaluation results are shown in Table 2.

TABLE 2

| | Suspension Structure | Point of Suspension | Suspender | Number of Intermediate Layers | Power Generation Amount (V) |
|---|---|---|---|---|---|
| Example 1 | Open-Close | 2 Points | Electrode | 1 | 4.4 |
| Example 2 | Open-Close | Whole width of upper surface | Electrode | 1 | 3.3 |
| Example 3 | Open-Close | 1 Point | Electrode | 1 | 6.3 |
| Example 4 | Open-Close | 1 Point | PET | 1 | 6.5 |
| Example 5 | Open-Close | 1 Point | Spring | 1 | 9.5 |
| Example 6 | Open-Close | 1 Point | String | 1 | 3.1 |
| Example 7 | Open-Close | 1 Point | String | 2 | 5.6 |
| Example 8 | Open-Close | 1 Point | String | 2 | 4.8 |
| Example 9 | Open-Close | 1 Point | String | 3 | 6.7 |
| Comparative Example 1 | Sealed | 2 Points | Electrode | 1 | 0.7 |

It is clear from Table 2 that Examples 1 to 9 having an open-close structure (in which the lower end part of the power generating element 2 is openable and closable) are considerably greater than Comparative Example 1 having a sealed structure (in which the lower end part of the power generating element 2 is sealed) in terms of power generation amount. In particular, among the Examples having the open-close structure, Examples 4 and 5 (in which the power generating element is suspended by an elastic member stretchable in the vibration direction) and Examples 7 to 9 (in which the power generating element includes a plurality of contact/separation mechanisms each including a pair of the electrode and the intermediate layer) are much greater in terms of power generation amount.

Examples 1 and 2 are relatively smaller in power generation amount because the suspension condition is relatively stable even under vibration.

Example 6, in which the power generating element is suspended by the string 5, is relatively smaller in power generation amount because the string 5 absorbs vibration owing to its flexibility. However, even in Example 6, the power generation amount is 4 times or more of that of Comparative Example 1.

Even if the string 5 is replaced with a rubber member, the same result will be obtained.

FIGS. 14A to 14D are graphs showing power generation amount actually measured by an oscilloscope. The horizontal axis represents time (msec), and the vertical axis represents voltage (V) and displacement (mm) of the applied vibration.

Figure 14A:
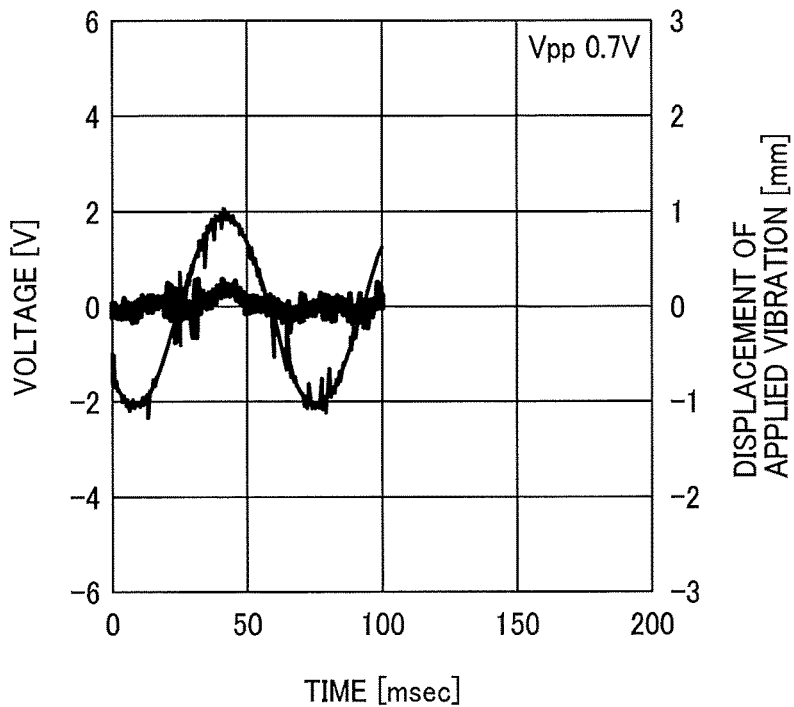
FIGS. 14A to 14D are graphs showing power generation amount measured in several Examples in the vibration test.
Figure 14B:
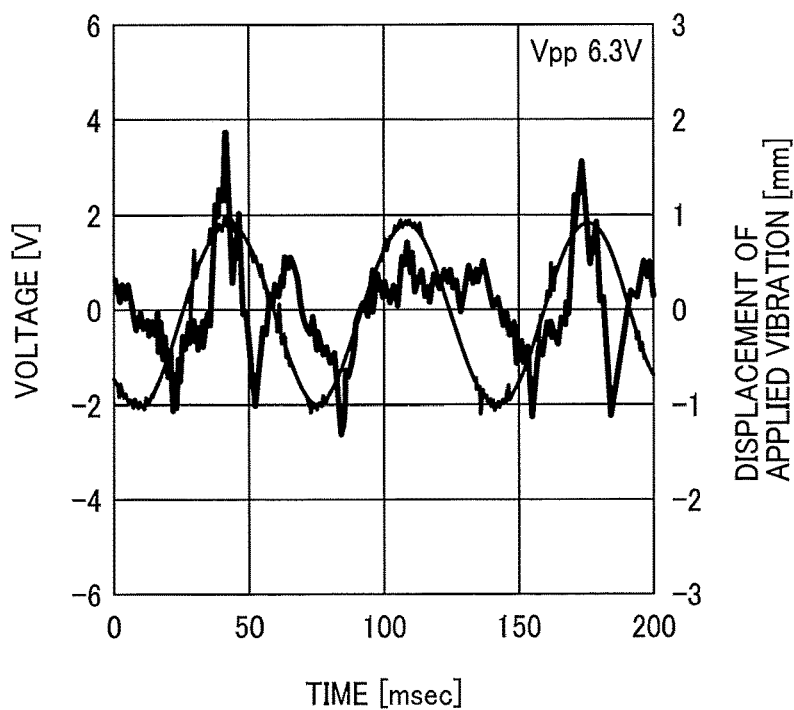
Figure 14C:
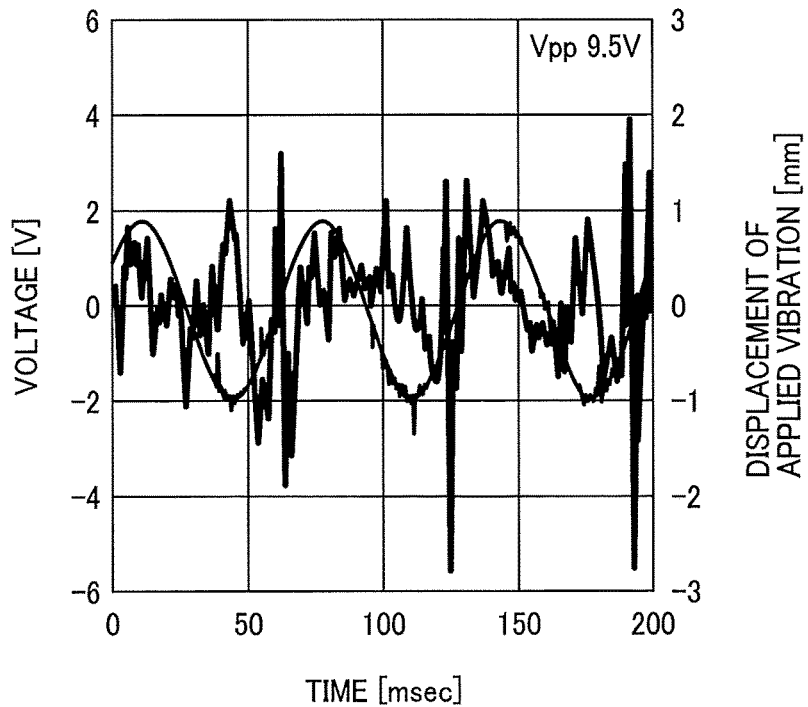

FIGS. 14A, 14B, and 14C respectively correspond to Comparative Example 1, Example 3, and Example 5.

Figure 14D:
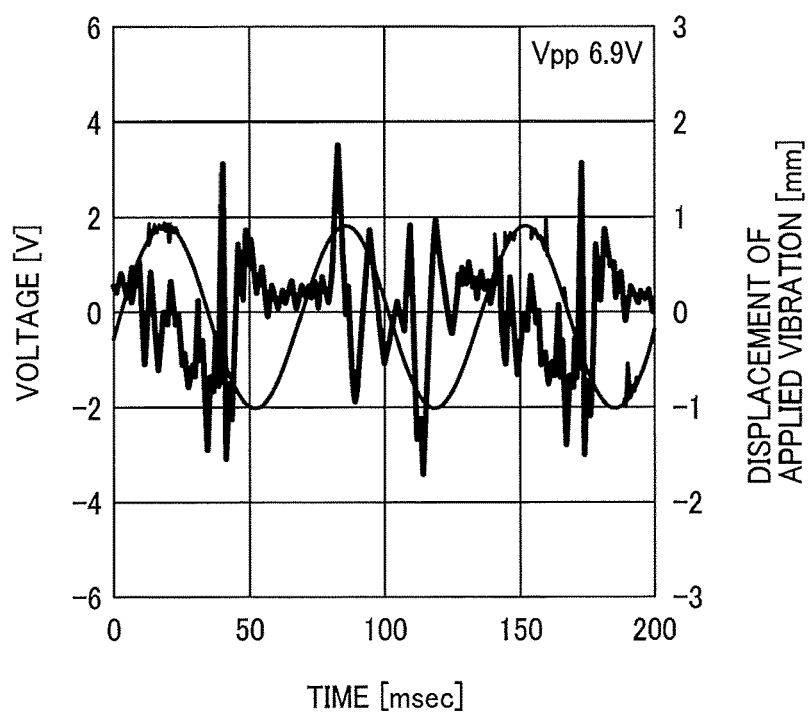

FIG. 14D corresponds to a case in which the power generating element 2 is reversed upside down and the two cover members 8 at the lower end sides are extended obliquely downward such that the power generating element 2 is vertically suspended upward by the lower surface.

FIGS. 14C and 14D indicate that the voltage waveform becomes jagged in a case in which an elastic force acts on the power generating element 2. FIG. 14B indicates that the voltage waveform becomes broad in a case in which the power generating element 2 is suspended by an inelastic member (e.g., lead wire).

A second embodiment of the present invention is described below with reference to FIGS. 15A and 15B. For the sake of simplicity, the same reference number will be given to identical constituent elements such as parts and materials having the same functions and redundant descriptions thereof omitted unless otherwise stated.

In the second embodiment, a separation member 21 is provided. The separation member 21 forcibly separates the first electrode 9 and one side of the intermediate layer 12 facing the first electrode 9, during transition of the power generating element 2 from the contact or close state to the separation state.

The separation member 21 is in the form of a triangular prism. The separation member 21 is secured to the bottom surface of the casing 3 such that the vertex of the triangular prism is positioned at the center of the lower end of the power generating element 2.

Figure 15A:
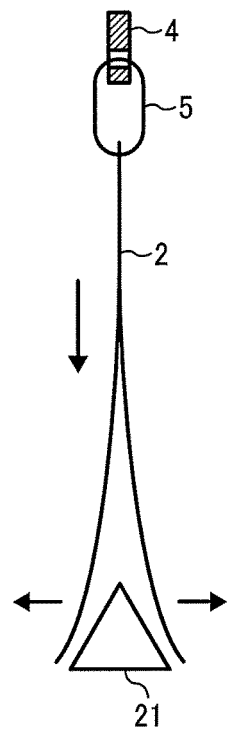
FIGS. 15A and 15B are schematic views of a power generating element according to an embodiment of the present invention, in a separation state and a contact state, respectively.

When the power generating element 2 moves downward by vibration, the separation member 21 forcibly separates the cover members 8 from each other, as illustrated in FIG. 15A.

Figure 15B:
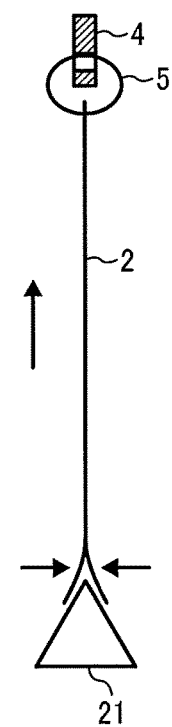

When the power generating element 2 moves upward by vibration, the separation member 21 guides the cover members 8 to close, as illustrated in FIG. 15B. In a case in which the upper end of the separation member 21 can get into the lower end of the power generating element 2 at the highest position, the contact/separation operation of the power generating element 2 is more reliably performed.

The separation member 21 may be integrally molded with the casing 3.

In such an embodiment in which the separation member 21 forcibly separates the cover members 8, the weight of the cover member 8 effectively act.

Figure 16A:
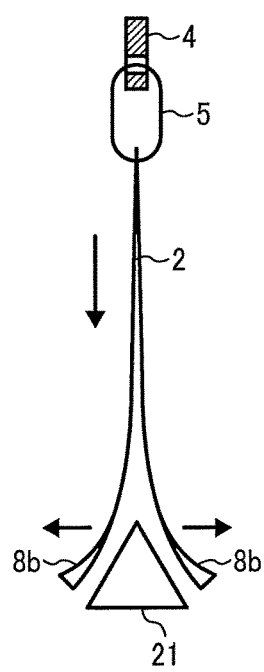
FIGS. 16A and 16B are schematic views of a power generating element according to an embodiment of the present invention, in a separation state and a contact state, respectively.
Figure 16B:
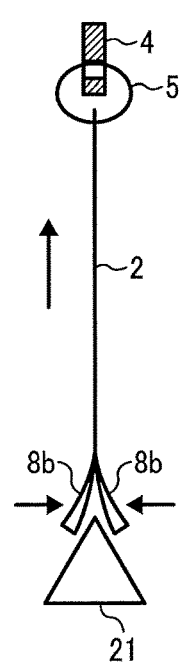

For example, in an embodiment illustrated in FIG. 16, the lower end part 8b of each cover member 8 is made thicker to add weight to the lower end part 8b (i.e., the one end closer to the separation member) of the cover member 8.

In this embodiment, power generation efficiency is improved since the closing operation is more rapidly and reliably performed owing to the added weight.

In the above-described embodiments, the first electrode 9 and the second electrode 11 are externally covered with the respective cover members 8. According to another embodiment, the cover member 8 is not necessary.

In the above-described embodiments, the power generating element 2 covered with the casing 3. According to another embodiment, the casing 3 is not necessary.

The power generating device according to some embodiments of the present invention can be used in various situations where environmental energy is usable. For example, the power generating device may be installed on a pallet to be loaded on a truck deck to be used as a power source for managing position information of physical distribution materials.

Electric power obtained from vibration may be accumulated in a power storage.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A power generating device comprising:
a power generating element comprising:
   an electrode pair including a first electrode and a second electrode; and
   an intermediate layer disposed between the first electrode and the second electrode, the intermediate layer being insulating and having a first side facing the first electrode and a second side facing the second electrode,
   wherein the first electrode and the intermediate layer together operate as a contact/separation mechanism configured to perform a contact/separation operation, when an external force is applied to the power generating element to generate power,
   wherein, in the contact/separation operation, the contact/separation mechanism transitions between a contact or close state in which the first electrode and the first side are brought into contact with each other or close to each other, and a separation state in which the first electrode and the first side are separated from each other, and
   wherein a universal hardness of the first side of the intermediate layer and a universal hardness of the second side of the intermediate layer are different from each other;
a suspension member to suspend the power generating element such that the contact/separation operation is performed when the power generating element receives a vibration as the external force; and
a separation member to forcibly separate the first electrode and the first side of the intermediate layer from each other in the separation state.

2. The power generating device of claim 1, wherein the contact/separation mechanism includes a plurality of pairs of the first electrode and the intermediate layer.

3. The power generating device of claim 1, wherein the intermediate layer includes a silicone rubber.

4. The power generating device of claim 3, wherein the first side of the intermediate layer has been surface-modified, so that an amount of deformation of the first side of the intermediate layer and an amount of deformation of the second side of the intermediate layer are different when the external force is applied to the power generating element.

5. The power generating device of claim 1, wherein first longitudinal ends of the electrode pair and the intermediate layer are put together while second longitudinal ends of the electrode pair and the intermediate layer are free, to allow the contact/separation mechanism to transition between the contact or close state and the separation state.

6. The power generating device of claim 5, wherein the power generating element further comprises at least two cover members, and
   wherein each of the first electrode and the second electrode is secured to the respective cover members, and the intermediate layer is secured to one of the first electrode and the second electrode.

7. The power generating device of claim 1, wherein the suspension member has elasticity to be stretchable in a direction of the vibration.

8. The power generating device of claim 7, wherein the suspension member includes a coil spring.

9. The power generating device of claim 1, further comprising a casing,
   wherein the casing stores the power generating element and the suspension member.

10. The power generating device of claim 1, further comprising a casing,
    wherein the casing stores the power generating element, the suspension member, and the separation member.

11. The power generating device of claim 10, wherein the separation member is integrated with the casing.

12. The power generating device of claim 1, wherein a first longitudinal end of the power generating element closer to the separation member is heavier than a second longitudinal end of the power generating element.

13. The power generating device of claim 1, wherein a ratio of the universal hardness of the first side of the intermediate layer to the universal hardness of the second side of the intermediate layer is between 1.01 and 1.70.

* * * * *